Patented Mar. 15, 1927.

1,621,240

UNITED STATES PATENT OFFICE.

WILLIAM J. DENNIS, OF ATTLEBORO, MASSACHUSETTS.

VERMIFUGE AND INSECTICIDE. REISSUED

No Drawing. Application filed April 16, 1923. Serial No. 632,358.

The object of my invention is to provide a vermifuge and insecticide useful for killing flies and other insects, parasites and vermin or other living things which may be killed by contact poisons.

A further object is to provide such a product which can be used as a powder or in solution as a spray or otherwise for plants, trees or animals or as a concentrated extract.
The invention consists of a compound obtained from the root or plant known in Peru as cube, which is found in Peru and other South American countries. The plant is a woody shrub classified by some native botanists as of the family Solanaceæ.

The compound is obtained by expressing or extracting from the root or plant.

A method for securing the compound may be, as follows:
The roots or plants may be pulverized or divided into fine particles in a suitable grinder and the resultant powder drawn off by an aspirator, as by a fan and delivered to a concentrator.
From the concentrator, the powder may be delivered to a container and there subjected to a suitable solvent, such as benzol, alcohol, and so forth.

The solution is passed through a filter for removing the woody fibre and the product passing from the filter is the extract in solution, which is delivered to the evaporator.

After drying or evaporating, the concentrated extract may be removed for use as such.

The powder is a light straw color, odorless and tasteless.

For identification, the powder may be subjected to the action of concentrated sulphuric acid and dilute nitric acid, whereupon it gives a bright clear red color. By the addition of potassium hydroxide in nearly equal volume, a vigorous action is obtained, and the solution turns to a yellowish pink. A further addition of potassium hydroxide produces a stable brown solution.

The compound in the form of powder or dust may be used as an insecticide with talcum powder, cornstarch or other carrier. It is very effective against flies, roaches and other insects. It is my belief that the powder sets up an irritation of the breathing apparatus which results in early death.

The compound can be used with water or with soap and water or other emulsifying agent, as a wash or spray for plants, animals or trees. It is effective against aphids, beetles, some insects and worms.

It can be used as an extract with alcohol for similar purposes, for instance as a wash for ticks on cattle.

As an alcoholic extract, tests show the solution to have slightly greater effectiveness when sprayed on the cotton aphid than nicotine sulphate. Experience shows that it is eight times as effective as similar derris extract.

The proportions of the compound and the carrier may be varied as desired for different purposes.

For certain purposes, it is desirable to use the alcoholic extract in a soap and water emulsification. A suitable solution for aphids can be made by using the extract from one third pound of powder in one hundred gallons of soap solution.

I claim as my invention:

1. An insecticide and vermifuge comprising ground cube root with the fibrous element removed.

2. An insecticide and vermifuge comprising extract of cube root, said extract being capable of identification by subjecting the extract to sulphuric and nitric acid whereupon it gives a bright red color, and thereafter adding potassium hydroxide in nearly equal volume whereupon a yellowish pink is obtained.

3. An insecticide and vermifuge comprising extract of cube, said extract being capable of identification by subjecting the extract to sulphuric and nitric acid whereupon it gives a bright red color, and thereafter adding potassium hydroxide in nearly equal volume whereupon a yellowish pink is obtained, and finally adding more potassium hydroxide which produces a stable brown solution.

4. An insecticide and vermifuge comprising concentrated extract of cube and a carrying agent.

5. An insecticide and vermifuge ingredient, comprising the concentrated extract of the root of the cube, said extract being capable of identification by subjecting the extract to sulphuric and nitric acid whereupon it gives a bright red color, and thereafter adding potassium hydroxide in nearly equal volume, whereupon a yellowish pink is obtained.

Des Moines, Iowa, April 4, 1923.

WILLIAM J. DENNIS.